United States Patent [19]
Hehl

[11] 3,851,794
[45] Dec. 3, 1974

[54] AN EXPANSIBLE HOLEPLUG WITH SEAL

[75] Inventor: Klaus Friedrich Hehl, Norderstedt, Germany

[73] Assignee: ITW-ATECO G.m.b.H., Norderstedt, Germany

[22] Filed: July 12, 1973

[21] Appl. No.: 378,469

Related U.S. Application Data

[63] Continuation of Ser. No. 176,173, Aug. 30, 1971, abandoned.

[52] U.S. Cl.............. 220/308, 220/315, 220/359, 215/232
[51] Int. Cl............................................ B65d 39/12
[58] Field of Search...... 220/24 R, 24 A, 24.5, 42 B

[56] References Cited
UNITED STATES PATENTS
2,024,495   12/1935   Wolfe.......................... 220/24.5 UX
2,671,574   3/1954   Wolfe.............................. 220/24.5

Primary Examiner—George T. Hall
Attorney, Agent, or Firm—Robert W. Beart; Thomas W. Buckman

[57] ABSTRACT

This invention relates to a method of reliably sealing varnish exit holes in work panels, in particular in bodies of automotive vehicles, by means of a hole plug inserted in the hole, said plug having a closed bottom wall, a head superimposing the margins of the work panel and an annular collar joining said bottom wall to said head.

1 Claim, 3 Drawing Figures

Inventor:
Klaus F. Hehl
By Thomas W. Buchmore
Robert W. Beart
His Att'ys

AN EXPANSIBLE HOLEPLUG WITH SEAL

This is a continuation of application Ser. No. 176,173, filed Aug. 30, 1971 now abandoned.

For closing so-called varnish or paint exit holes in automotive vehicles or also for closing holes in housings of sheet metal or in plates or panels hole plugs are used. They are urged into the opening from one side, sealed, and are self-seating by virtue of the shape strength. The cup-shaped portion of the hole plug, comprising a bottom wall and an adjacent annular collar, is urged into the opening to such an extent that the head of the hole plug abuts the front margin of the opening.

Such plugs up to now generally could not be formed in such a way that they reliably protect the holes against the intrusion of water, so that at these sites there was the risk of rusting or intruding of water through the opening. Other plugs are formed in such a way that they did not stay reliably seated and become loose due to vibrations.

A hole plug of this type has now been proposed which has a central bulged portion directed to the head in the bottom wall, and a conical configured bottom wall surrounding said bulged portion. This hole plug can be made in a simple and economical manner of a soft resilient material such as plastic, and it can be inserted reliably and unloosably in an opening even though it may additionally be provided at the outside with a projecting annular bead.

It is further proposed for increasing the sealing effect, that the flange-like head be inclined slightly downwardly from the inside to the outside in direction to the work panel, or is formed in a conical section so that it pressingly engages the surface of the work panel in resiliently deforming upon inserting the hole plug.

In some instances, however, such a hole plug does not fulfill the requirements regarding a reliable sealing against the intrusion of humidity of any sort.

The invention is thus based on the problem of providing a method of applying the above mentioned hole plug which brings about an extremely reliable sealing. The method comprises placing a fusible film of plastic between the head and margins of the opening prior to inserting the collar of the hole plug in the opening of the work panel, then the hole plug is urged in and finally the film between the head and the work panel is subjected to a temperature sufficient to cause a melting thereof.

The invention is explained in closer detail hereinafter by way of examples in referring to the drawing. Therein:

Figure 1:
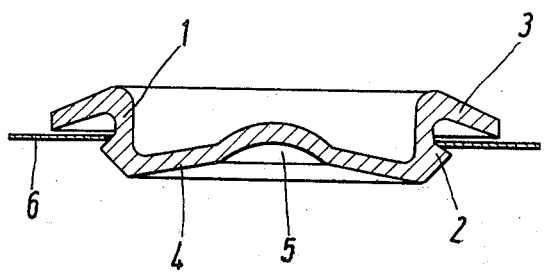
FIG. 1 is a sectional view of a hole plug of this invention with a fusing and adhering film.

The hole plug illustrated in a sectional view in FIG. 1 includes a conically inwardly inclined bottom wall 4 having a likewise inwardly directed central bulged portion 5, an adjacent annular collar 1 and a flange-like head 3 adjacent thereto extending downwardly inclined slightly, i.e., extending toward the bottom wall. An annular bead 2 projects outwardly from the collar 1 in the vicinity of the bottom wall 4. An annular-disc like film 6 of a material shrinking under the effect of heat and becoming adhesive is associated to the hole plug.

Figure 2:
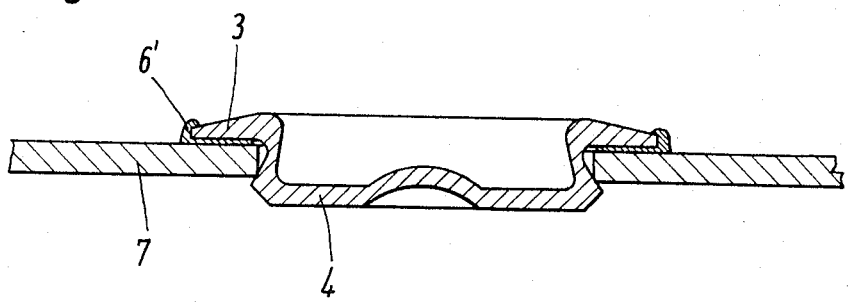
FIG. 2 is a sectional view of the hole plug of FIG. 1, which is inserted in a work panel and the film of which has shrunk by the effect of heat.

In FIG. 2 the hole plug of FIG. 1 has been illustrated inserted in a work panel 7. For doing so the hole plug first has been inserted in the opening of the work panel 7 with the fusing and adhering film, and its bottom wall 4 has been inverted in the radial position illustrated in FIG. 2. Thereby, an expansion of the annular bead 2 resulted, which thereby moves over the margins of the opening of the work panel and unloosably retains the hole plug therein. At the same time the film 6 had been firmly urged against the rims of the opening of the work panel in resiliently deforming the head 3. Finally the fusing and adhering film had been caused to melt by subjecting it to heat and thereby brought into the final shape 6 illustrated in FIG. 2 in which the film sealingly bonds the facing surfaces of the work panel 7 and of the head 3 of the plug to one another.

Figure 3:
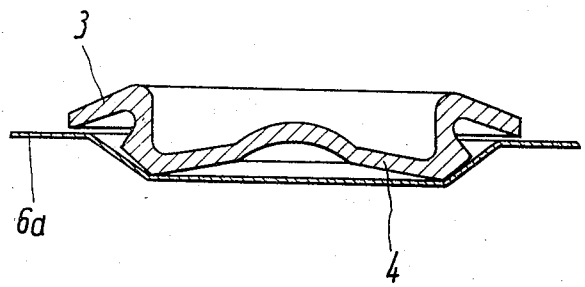
FIG. 3 is a sectional view of a hole plug with a closed fusing and adhering film associated thereto.

In FIG. 3 the same hole plug having a head 3 and a bottom wall 4 has been illustrated prior to inserting it in an opening of a work panel together with a piece of coherent fusing and adhering film 6a. The film first of all has a planar shape. In the drawing, it has been indicated already, however, in which way the film at the beginning of the insertion in the opening deforms; finally, the film in its outer annular portion assumes the same shape as a film according to FIG. 1 has, while it on the other hand surrounds the annular bead and the bottom wall of the hole plug, however.

Such fusing and adhering film material is already known which has the property of contracting, and in doing so at the same time a compacting is effected, in case the film material is heated in excess of a predetermined critical temperature without being caused to completely melt. If the fusing or adhering film is prevented to shrink partially by a firm clamping, it merely melts at those locations where it is not clamped in and bonds the sheet metal and the plug to one another. There it then causes a reliable sealing.

In case the film is not excessively firmly clamped in between the head and the work panel, for instance because a comparatively thin head is selected and relatively soft material has been chosen for the hole plug, of course in this clamped in portion also a certain shrinking of the film is effected which then increases further the engaging pressure between the head and the work panel and thereby again improves the seal.

The heating can be effected in various ways, for instance by hot air. In this instance the fusing and adhering of the film placed between the sheet metal and the plug can be caused by the heat existing in the drying oven for the varnish. Also, a heating can be effected in setting out from the margins of the opening in the work panel. Preferably it is proposed that the margins of the opening in the work panel are preheated to a little in excess of the shrinking temperature prior to inserting a hole plug and applying the film. This can be done by applying a heated die to the opening of the work panel or into it shortly prior to inserting the hole plug provided with a fusing or adhering film and is maintained in a good heat contact with the margins of the opening of the work panel.

The fusing and adhering film does not need to be provided in the form of a ring between the head of the hole plug and the work panel. Rather it is proposed for simplifying and rendering more economical the method that a closed piece of fusing and adhering film is used. In this regard it will of course be insured in all events that the film radially projects beyond the head of the hole plug only slightly, i.e., has the shape thereof and is provided with a slightly larger diameter or a slightly larger outer dimension than the plug. The use of a closed fusing and adhering film eliminates the stamping of a hole in the film and thus renders more economical the method. Also closed fusing and adhering film pieces can be used for hole plugs of different diameters. The film is applied smoothly on the work panel opening, and is doing so it overlaps the margins thereof. Then the hole plug is urged in in deforming and slightly stretching the film. Or the film piece may be placed underneath the bottom wall of the hole plug and is inserted together with it. This method is particularly advantageous in the case where the margins of the work panel have been preheated according to the proposal made hereinbefore.

The method can be practiced with various hole plugs, provided they have a collar closed by a closed bottom wall and a head superimposing the margins of the work panel. According to the invention, however, a special hole plug is proposed having fusing and adhering films for practicing the method. The further development of this invention comprises the hole plug including a bottom wall conically drawn in or inverted toward the head and provided at its middle with a bulged portion likewise inverted toward the head as well as an annular bead projecting outwardly from the collar in the vicinity of the bottom wall and the fusing and adhering film being formed in the way of an annular disc the inner diameter of which is larger than the outer diameter of the collar, but is smaller than the outer diameter of the annular bead and the outer diameter of which is larger than that of the head of the hole plug.

I claim:

1. A hole plug with a fusible film characterized in that the hole plug includes a bottom wall conically inverted toward the head and provided at its middle with a bulged portion likewise inverted toward the head as well as an annular bead projecting outwardly from the collar in the vicinity of the bottom wall and that the fusible film is an annular disc the inner diameter of which is larger than the outer diameter of the collar, but is smaller than the outer diameter of the annular bead and the outer diameter of the fusible film is larger than that of the head of the hole plug, the head being substantially conical and thereby adapted to resiliently deform upon the expansion of the annular collar so that the head compresses the sealing film while said film fuses to the head and work panels.

* * * * *